United States Patent [19]

Warner et al.

[11] Patent Number: 5,372,730
[45] Date of Patent: Dec. 13, 1994

[54] FILTERING SYSTEM FOR PUMP SHAFT SEALS

[75] Inventors: Dale J. Warner; Dale J. Warner, both of Palm Harbor, Fla.

[73] Assignee: A. W. Chesterton Company, Stoneham, Mass.

[21] Appl. No.: 107,058

[22] Filed: Aug. 17, 1993

[51] Int. Cl.$^5$ .................................... B01D 41/00
[52] U.S. Cl. ................................ 210/791; 210/171; 210/416.1; 210/411; 415/121.2; 415/169.1; 417/423.9; 277/23; 277/24
[58] Field of Search ............... 210/167, 168, 171, 791, 210/416.1, 416.5, 411; 417/423.1, 423.9; 415/121.2, 169.1; 277/23, 24; 184/6.24

[56] References Cited

U.S. PATENT DOCUMENTS

| | | | |
|---|---|---|---|
| 811,754 | 2/1906 | West | 210/315 |
| 2,007,501 | 7/1935 | Millmine | 277/23 |
| 2,334,396 | 11/1943 | Dorward, Jr. | 277/23 |
| 2,587,474 | 2/1952 | Howard | 277/23 |
| 2,907,594 | 10/1959 | Macks | 277/23 |
| 2,919,148 | 12/1959 | Smith | 277/23 |
| 3,168,513 | 6/1965 | Dunn et al. | 210/168 |
| 3,450,052 | 6/1969 | Turner et al. | 415/121.2 |
| 4,844,255 | 7/1989 | Schmitt | 277/23 |
| 4,851,135 | 7/1989 | Fisher | 210/168 |
| 4,872,690 | 10/1989 | Dunford | 277/24 |
| 5,167,418 | 12/1992 | Dunford | 277/24 |
| 5,234,316 | 8/1993 | Rupprecht | 415/121.2 |

Primary Examiner—Peter A. Hruskoci
Assistant Examiner—Robert James Popovics
Attorney, Agent, or Firm—Hill, Steadman & Simpson

[57] ABSTRACT

A filtering system for a pump shaft seal includes a filter for preventing abrasive, fibrous, or other solid materials from entering the region of the stuffing box of the pump in the proximity of the seal. The filter is mounted on the pump shaft between the pump impeller and the seal, adjacent a recirculation flush port of the pump. A venturi draw is used to continuously draw fluid from between the filter and the seal and webs arranged on the rotating filter cause a localized back flushing of the filter to remove accumulated solid material from a front face of the filter.

20 Claims, 1 Drawing Sheet

FILTERING SYSTEM FOR PUMP SHAFT SEALS

BACKGROUND OF THE INVENTION

The present invention relates generally to a reverse flush filter system provided between a mechanical seal and a pump impeller of a pump.

Pumps having mechanical seals, such as centrifugal pumps, are used in a number of applications involving the transfer of fluids. Fluids transferred by pumps often contain abrasive materials, such as sand or clay, or fibrous materials, such as paper pulp. Unfortunately, when fluids containing such abrasive or fibrous materials are transferred by a pump, a seal cavity of the pump becomes increasingly filled with deposits of the abrasive or fibrous materials. Deposits of these materials not only tend to abrade the rotating surfaces, but also tend to clog the moving components of the mechanical seal, thereby degrading the sealing surfaces of the mechanical seal. Further, such abrasive or fibrous material deposits restrict the capacity of the mechanical seal to compensate for radial and axial shaft deflection and face wear. In many instances, premature seal failures occur due to the clogging and degrading effects of abrasive or fibrous material deposits on the seal.

Conventionally, material deposits are flushed from the seal cavity by injecting clean fluid, such as water, into the seal cavity. However, injecting clean fluid into the seal cavity merely dilutes dirty fluid already present in the seal cavity. Eventually, as the concentration of material deposits in the seal cavity increases, paths develop where the clean fluid injected into the seal cavity flows, causing the material deposits to precipitate in the seal area.

When the material deposits precipitate in the seal area in this manner, large quantities of clean fluid must be used to flush the seal cavity. Further, even where large quantities of clean fluid are used to flush the seal cavity, only marginal results are achieved in removing material deposits from the seal cavity. The costs of flushing the seal cavity also increase as the quantity of clean fluid required to flush the seal cavity increases. Further, the costs of flushing the seal cavity must include the cost of removing excess clean fluid from the material being processed by, for example, pumping.

SUMMARY OF THE INVENTION

It is an object of the present invention to substantially reduce the amount of abrasive or fibrous material deposits that reach a pump shaft seal in a pump used for transferring fluids, thereby providing a relatively clean environment in a seal cavity of the pump.

The above object is achieved in a back flush filtering system for continuously flushing the pump shaft seal. The back flush filtering system includes a filtering device rotatably mounted on a shaft of the pump between an impeller of the pump and the pump shaft seal. By arranging a lower end of the filtering device between a flush port leading to a venturi and the pump shaft seal, the filtering device reverse flushes fluid in the pump several hundred times per minute. The device not only filters abrasive or fibrous material deposits from fluids transferred by the pump, but also prevents fibrous or abrasive material deposits from reaching the seal cavity.

DETAILED DESCRIPTION OF THE PREFERRED EMBODIMENT

Figure 1:
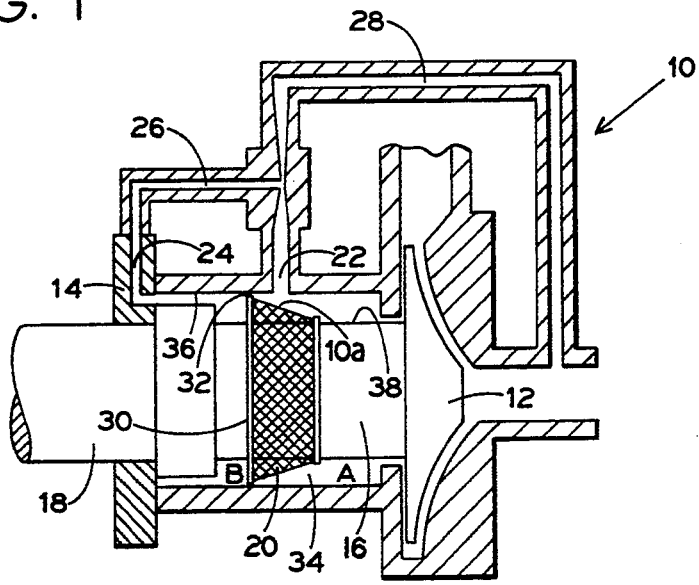
FIG. 1 illustrates a schematic sectional view, partially broken away, of a pump constructed in accordance with the principles of the present invention.

As illustrated in FIG. 1, a pump 10 includes a pump impeller 12 and a pump shaft seal such as a mechanical seal 14. The pump impeller 12 is mounted on a first end 16 of a rotating shaft 18. A rotating filter 20 is mounted on the shaft 18 between the pump impeller 12 and the mechanical seal 14. The mechanical seal 14 surrounds the shaft 18 and prevents fluid leakage from the pump 10 in the area of the shaft 18.

The pump 10 also includes a flush port 22, a seal flush port 24, venturi line 26, and a suction line 28. The rotating filter 20 can be rotatably mounted on the shaft 18 such that an outer axial end 30 of the rotating filter 20 is approximately ⅛" outboard of the flush port 22. The rotating filter 20 is mounted on the shaft 18 within stuffing box 34, such that a clearance is provided between the major outer diameter 32 of the rotating filter 20 and an inner diameter 36 of the stuffing box 34. A clearance of 0.005 to 0.015 inches is advantageous. A mechanical seal or contact between the diameters 32 and 36 is not intended.

During operation of the pump 10, the shaft 18 and the filter 20 are typically rotating at between 1750 and 3450 RPM. This creates a higher fluid pressure in the cavities A and B of the stuffing box 34 then in the port 22 and the suction outlet 28.

As fluid passes beyond the pump impeller 12 into the region of the stuffing box 34, a differential pressure is created within the stuffing box 34 by the rotation of the shaft 18 and the filter 20. Thus, fluid at surface 38 of the shaft 18 has a rotational velocity that is approximately the same as the rotational velocity of the shaft surface 38, whereas fluid along the inner diameter 36 of the stuffing box 34 has a rotational velocity of smaller magnitude than the rotational velocity at the shaft surface 38. Fluid between surfaces 36 and 38 has a rotational velocity of a proportionate magnitude between the rotational velocity at 36 and the rotational velocity at 38. The fluid pressures in cavities A and B are relatively equal.

The filter 20 prevents premature failure of the mechanical seal 14 by preventing abrasive materials contained in the fluid from reaching the mechanical seal 14. The abrasive materials are prevented from reaching the mechanical seal by the reverse flush action of the system in combination with the pressure differential created by the filter 20. Rotation of the surface 20a of the screen 20 causes a tube of flow 20b of the fluid, where the tube of flow is substantially toroidal in shade, about the surface 20a of the filter 20.

The centrifugal forces within the tube of flow 20b increase radially from the surface 20a. Abrasive materials in the fluid within the tube of flow 20b are forced to the area of greatest diameter of the tube of flow. The tube of flow is contained by the inner diameter 36 of the stuffing box 34, except at an inlet of flush port 22. The fluid pressure within the tube of flow is greater than the fluid pressure in cavities A and B because of the centrifugal force in the tube of flow. Further, the fluid pressure at the inlet of flush port 22 is less than the fluid pressure of the cavities A and B and is less than the fluid pressure of the tube of flow. The fluid pressure differentials thus formed cause a continuous flow of the fluid within the tube of flow as the fluid rotates and passes the inlets to port 22.

Figure 2:
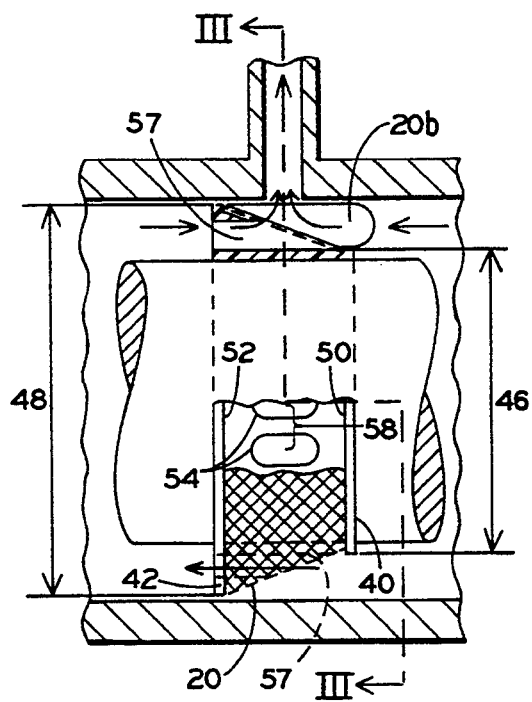
FIG. 2 illustrates a detailed sectional view of the pump of FIG. 1.

Reverse flushing action of the fluid is achieved by the configuration and rotation of the filter 20. As illustrated in FIG. 2, the filter 20 includes a circular inboard section 40 and a circular outboard section 42. An inner diameter of the circular inboard section 40 and an inner diameter of the circular outboard section 42 are integrally connected by a circular central section 44, illustrated in FIG. 3. The circular central section 44 is arranged perpendicular to the circular inboard section 40 and to the circular outboard section 42. The circular outboard section 42 is wider than the circular inboard section 40, such that an outer diameter 46 of the circular inboard section 40 is disposed radially inward from an outer diameter 48 of the circular outboard section 42. A screen is mounted between an outer end of a lower surface 50 of the circular inboard section 40 and an outer end of an upper surface 52 of the circular outboard section 42, such that the screen is angled outwardly from the lower surface of the circular inboard section to the upper surface of the circular outboard section.

Figure 3:
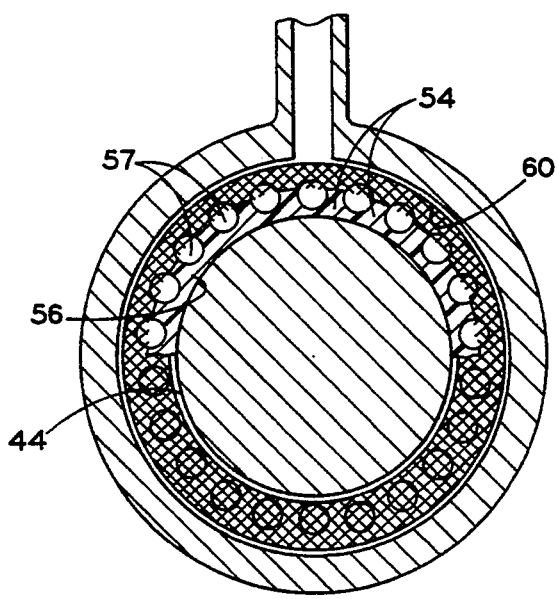
FIG. 3 illustrates a sectional view through lines III—III of FIG. 2.

A plurality of webs 54, illustrated in FIGS. 2 and 3, are formed extending radially from an inner wall 56 of the central section 44. The webs 54 are tapered to fit closely beneath the screen 20. The webs 54, the bottom section 42, the top section 40 and the inner wall 56 can be formed integrally as a cone shape with axially parallel bores 57 arranged around a circumference of the cone shape.

The rotational velocity of the plurality of webs 54 as the filter 20 rotates about shaft 18 is greater than the rotational velocity of the tube of flow due to slippage between the tube of flow and the outboard surface 20a of the filter 20. As the filter 20 rotates, fluid becomes trapped in the bores 57 formed by the plurality of webs 54 and an inner diameter 60 of the surface 20a. The rotational velocity of fluid trapped between the plurality of webs 54 and the inner diameter 60 of the surface 20a is equivalent to the rotational velocity of the filter 20. Therefore, the centrifugal force on the fluid trapped between the plurality of webs 54 and the inner diameter 60 of the surface 20a is greater than the centrifugal force on the fluid within the tube of flow 20b, creating a pressure differential. The differential pressure is insufficient to cause reverse flow through the surface 20a except in the area of the inlet to flush port 22, where the pressure is much lower.

The velocity of the reverse flow from the cavity formed by the plurality of webs 54 and the inner diameter 60 of the surface 20a is proportional to the differential pressure between the inner diameter 60 and the surface 20a. The volume of the reverse flow is proportional to the area of the surface 20a subject to the pressure differential and the time it takes the surface 20a to pass the flush port 22. Thus, reverse flow from cavity B through the surface 20a is concentrated in the area of the inlet of flush port 22. The reverse flow of the fluid in the region of the inlet of flush port 22 is a high velocity flow, compared to the rate at which the fluid leaving cavity B by the reverse flow is replaced with fluid from cavity A. Further, the area of the outboard surface 20a that is subject to reverse flow at any given time is less than 8% of the total surface 20a. The high velocity reverse flow of the fluid from the cavity B to A flushes solids from the surface 20a.

Once the abrasive materials from the fluid enter through the inlet to flush port 22, they flow through a venturi 62, illustrated in FIG. 1, and arranged at an intersection between venturi line 26, suction line 28, and flush port 22. The venturi 62 is provided for increasing the flow rate of the abrasive or fibrous material deposits and fluid through seal flush port 24.

In essence, the filter configuration serves to trap abrasive or fibrous material deposits in the tube of flow rotating about the filter, and to flush the abrasive or fibrous material deposits from the outboard surface of the filter in the region of the inlet to the flush port by a high velocity reverse flushing in the region of the port. High velocity reverse flushing in the region of the port is achieved by pressure differentials between the fluid trapped between the webs and the inner diameter of the outboard surface and between the fluid in the tube of flow.

The total flow through the screen 20 is divided at approximately 20% through the seal flush port 24 and 88% through the flush port 22. The area of the screen 20 subject to reverse flushing through the screen is less than 8% of the total screen area. Nearly 100% of the flow from cavity A to cavity B is passing through approximately 90% of the area 20a of the screen 20. The reverse flow of approximately 80% of the flow through the screen is concentrated in approximately 10% of the screen area. This results in relative high velocity flow in the reverse flow area and relatively low velocity flow from cavity A to cavity B. A further advantage is the avoidance of imbedding solids on the face of the screen during the flow from cavity A to cavity B with a high velocity back flow to flush solids from the face of the screen. This results in reverse flushing the screen 1750 to 3450 times per minute avoiding any build-up on the face of the screen.

Further, each screen section or outboard surface section in conjunction with an associated web serves as its own impeller. The system is self flushing, and does not require an external water source to supply clean fluid in the area of the seal.

However, the invention can be used with a "clean" barrier fluid system. In this system clean fluid is injected into seal flush port 24 and the flush port 22 is closed. Clean fluid flows from cavity B to cavity A through the screen 20. The fluid flows past the impeller and into the pump discharge. Less clean fluid is required by using a screen than would otherwise be required. There is no direct path past the screen for solids to enter the cavity B. The rotating tube of flow 20b produces a fluid flow at right angles to the axis of the shaft. Any flow from cavity A to cavity B along the surface 36 would be at right angles to the flow of the tube of flow 20b and would be deflected thereby.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim as our invention:

1. A filtering system for a pump having a pump casing with a mechanical seal cavity for preventing solid material deposits within the fluid being pumped from entering the mechanical seal cavity, comprising:

filtering means, disposed within the pump casing along and carried by a pump shaft for rotation therewith between a pump impeller and a mechanical seal of the pump, the mechanical seal located in the mechanical seal cavity, for removing the solid material deposits from the fluid to prevent the solid material deposits from reaching the seal cavity of the pump; and web means, arranged with the filtering means, and fixed on the pump shaft for rotation therewith for establishing a pressure differential to achieve a reverse flushing of the filtering means to remove the solid material deposits out of a flush port of the pump casing.

2. A filtering system as claimed in claim 1, wherein the filtering means comprises a generally conical surface mounted coaxially on the pump shaft.

3. A filtering system as claimed in claim 2, wherein the generally conical surface comprises a screen having a uniform mesh size.

4. A filtering system as claimed in claim 1, wherein the filtering means comprises a circular inboard flange, a circular outboard flange, and a generally conical screen disposed therebetween.

5. A filtering system as claimed in claim 4, wherein the filtering means comprises a circular center section spanning between the circular inboard flange and the circular outboard flange.

6. A filtering system as claimed in claim 5, wherein the web means is further defined by a plurality of angularly spaced apart webs formed radially extending between the circular center section and the generally conical screen.

7. A filtering system as claimed in claim 4, wherein the circular outboard flange is disposed between the flush port of the pump casing and the mechanical seal of the pump.

8. A filtering system as claimed in claim 1, further comprising a venturi arranged flow connected to the flush port and means for flow connecting to the seal cavity to a suction port of the venturi.

9. A filtering system as claimed in claim 1, wherein the filtering means is housed within a portion of the pump casing and wherein a radial clearance is provided between the filtering means and the portion of the pump casing.

10. A filtering system as claimed in claim 9, wherein the radial clearance ranges from 0.005 to 0.015".

11. For a pump which pumps fluid having entrained solid material, a filtering system for preventing solid material from entering a seal cavity of a pump casing, the filtering system mounted onto an impeller shaft of the pump between an impeller and a seal within the seal cavity, wherein the seal acts to seal the impeller shaft to the pump casing, comprising:

a filter having a circular inboard end and a circular outboard end, a circular center section connecting the circular inboard end to the circular outboard end, a generally conical screen spanning between outer flanges of the circular inboard end and the circular outboard end; and a plurality of radially extending webs extending from the circular center section and extending to the generally conical screen.

12. A filtering system as claimed in claim 11, wherein adjacent webs of the plurality of webs define an outlet formed in the circular outboard end.

13. A filtering system as claimed in claim 11, wherein said filtering system is located in a stuffing box region of the pump casing and further comprising a flush port flow connecting a suction side of the pump to the stuffing box region and wherein the circular center section is mounted on the pump shaft such that the circular outboard end is axially located between the flush port and the pump shaft seal.

14. A filtering system as claimed in claim 13, wherein a clearance is provided between an inside wall of the stuffing box region and the circular outboard end.

15. A filtering system as claimed in claim 14, wherein the clearance ranges from 0.005 to 0.015".

16. The filtering system as claimed in claim 11, wherein adjacent webs define an open ended right circular cylinder between said outboard end and said screen.

17. A method for preventing solid material deposits within the fluid being pumped from entering a seal cavity of a pump, the seal cavity housing a shaft seal for a pump having an impeller mounted on a shaft, comprising the steps of:

providing a shaft carried filter which substantially covers a flow path of the fluid being pumped between the impeller of the pump and the shaft seal;

mounting the filter for rotation with a shaft of the pump between the pump impeller and the pump shaft seal;

rotating the shaft and the filter during pump operation;

passing fluid from said flow path through said filter in a first direction; and continuously reverse flushing said fluid by rotation of the filter.

18. A method as claimed in claim 17, comprising the further steps of selecting a filter having a predetermined mesh size and forming the filter in a generally conical shape and arranging the filter spanning inboard and outboard flanges.

19. A method as claimed in claim 17, comprising the further steps of:

drawing fluid in a first stream at a location between said filter and said impeller in the vicinity of said screen, by piping to a suction side of the pump; and using the first stream in a venturi flow tube to suction a second stream drawn from between said filter and said shaft seal.

20. A method as claimed in claim 19, wherein said step of drawing said first stream is further defined in that said first stream is drawn from a flush port closely adjacent said screen: and said step of reverse flushing is further defined in that said screen comprises a plurality of webs for imparting pressure on a portion of said fluid in said flow path to cause reverse flushing adjacent said flush port.

* * * * *